(12) United States Patent
Bos et al.

(10) Patent No.: US 11,640,411 B2
(45) Date of Patent: May 2, 2023

(54) DATA REPLICATION SYSTEM

(71) Applicant: SAP SE, Walldorf (DE)

(72) Inventors: Daniel Bos, Beijing (CN); Joao Pedro Duro Reis, Porto Alegre (BR); Tobias Karpstein, Eschelbronn (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/386,225

(22) Filed: Jul. 27, 2021

(65) Prior Publication Data

US 2023/0034941 A1    Feb. 2, 2023

(51) Int. Cl.
*G06F 16/27* (2019.01)
*G06F 16/22* (2019.01)

(52) U.S. Cl.
CPC .......... *G06F 16/27* (2019.01); *G06F 16/2282* (2019.01)

(58) Field of Classification Search
CPC ....................................................... G06F 16/27
USPC .......................................................... 707/625
See application file for complete search history.

(56) References Cited

U.S. PATENT DOCUMENTS

| | | | |
|---|---|---|---|
| 2009/0083341 A1* | 3/2009 | Parees | G06F 16/2365 |
| 2012/0005160 A1* | 1/2012 | Naicken | G06F 16/28 |
| | | | 707/627 |
| 2013/0159247 A1* | 6/2013 | Engelko | G06F 16/219 |
| | | | 707/E17.005 |
| 2018/0137186 A1* | 5/2018 | Brodt | G06F 16/275 |
| 2021/0390094 A1* | 12/2021 | Cseri | G06F 9/4881 |

* cited by examiner

*Primary Examiner* — Muluemebet Gurmu
(74) *Attorney, Agent, or Firm* — Sterne, Kessler, Goldstein & Fox P.L.L.C.

(57) ABSTRACT

Disclosed herein are various embodiments for a data replication system. An embodiment operates by determining that a plurality of records of a source table are copied from a source system to a target table of a target system. It is determined that a change table, of the source system, associated with the source table is populated with a plurality of changes occurring to at least a subset of records of the plurality of records while the plurality of records are being copied from the source table of the source system to the target table of the target system. It is determined that the plurality of changes are copied to a shadow table of the target system. It is determined that the target table includes the plurality of records from the source table. The plurality of changes of the shadow table are merged with the target table.

20 Claims, 3 Drawing Sheets

DATA REPLICATION SYSTEM

BACKGROUND

Replicating data from one system to another can be a slow and time consuming process, particularly if there is a large amount of data to be replicated. Data replication often requires not only copying data from a first location to a second location, but also tracking any changes that occurred on the original data during the copying process, and then transferring the changes to the copied data. This subsequent transferring of changes can require even more time and resources beyond the initial load, and gets worse as the size of the original data set increases and/or the number of changes that occur on the original data while the data is being copied increases.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Replicating data from one system to another can be a slow and time consuming process, particularly if there is a large amount of data to be replicated. Data replication often requires not only copying data from a first location to a second location, but also tracking any changes that occurred on the original data during the copying process, and then transferring the changes to the copied data. This subsequent transferring of changes can require even more time and resources beyond the initial load, and gets worse as the size of the original data set increases and/or the number of changes that occur on the original data while the data is being copied increases.

Figure 1:
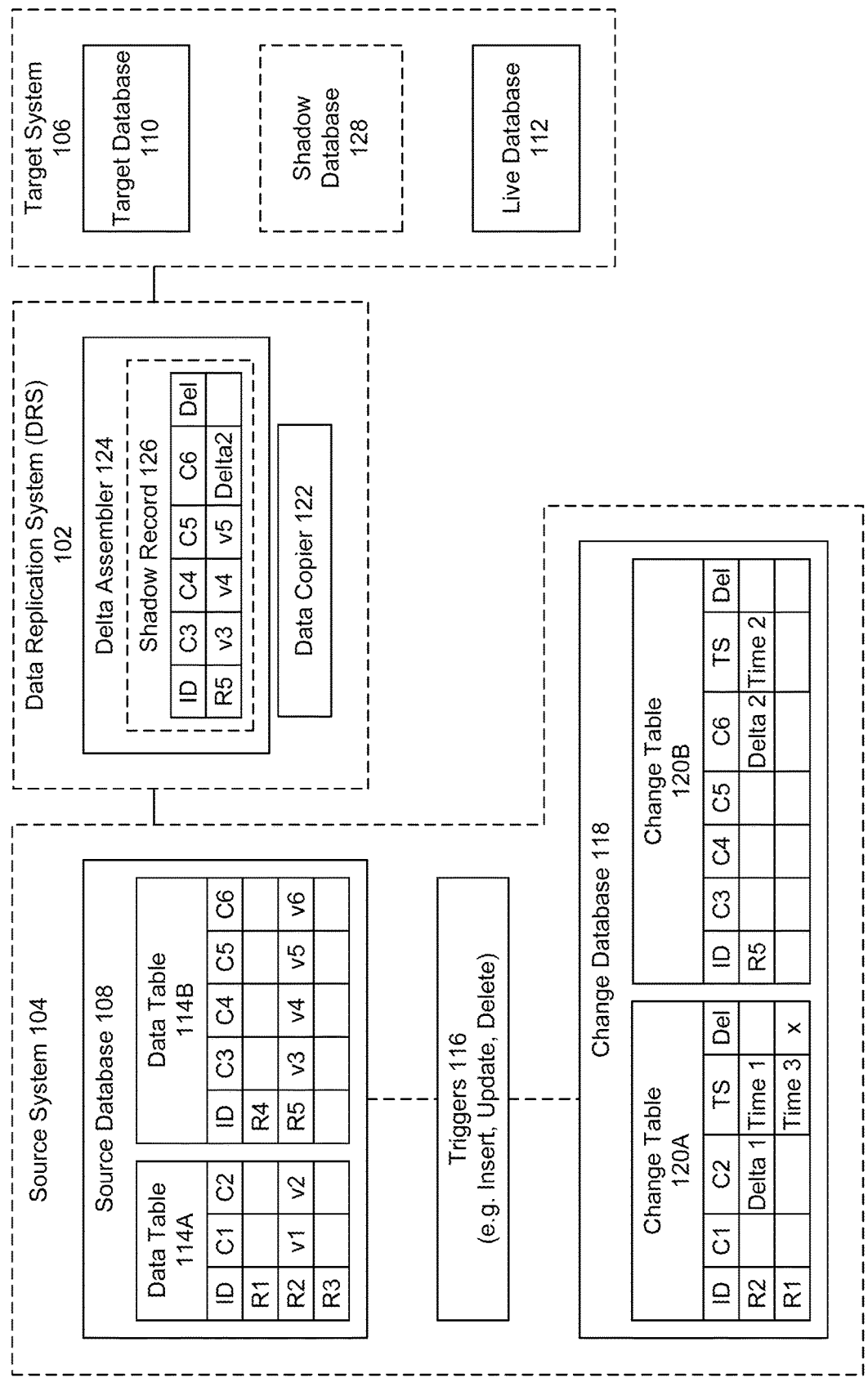
FIG. 1 is a block diagram illustrating functionality for a data replication system (DRS), according to some example embodiments.

FIG. 1 is a block diagram 100 illustrating functionality for a data replication system (DRS) 102, according to some example embodiments. DRS 102 may improve the functionality of computing resources and more efficiently utilize existing computing resources to reduce the time and resources required to perform data replication. DRS 102 may enable a replication or target system 106 to more quickly replicate data, including implementing intervening data changes that may have occurred on the original source data during an initial load process, from a source system 104 and reach a state of real-time replication more quickly than may otherwise be possible, thus saving valuable computing resources and time while increasing both performance and customer satisfaction.

When the data of a source database 108 is to be replicated from a source system 104 to a target system 106, the source database 108 may initially be copied to a target database 110 of target system 106, during an initial load process.

In some embodiments, target database 110 may include a schema or organization of data across identically named rows, columns, tables, etc., identical to source database 108. In some embodiments, a data copier 122 may copy data from at least a selection of the various data tables 112A, 112B of source database 108 to the corresponding tables (not shown) of target database 110. Depending on the size of source database 108, this initial load can require hours or even days to complete.

In some embodiments, the schema of target database 110 may vary from the schema of source database 108. Then, for example, the data copier 122 both copy and/or perform data transformations on the data being copied. These data transformations may include combining, adding, deleting, or otherwise updating data. This transformed data may be formatted and organized to fit into the new schema of target database 110.

While the initial load is being processed and the data is being copied (and/or transformed) from source database 108 to target database 110, the original data of source database 108 may be live and may be changed by various clients, systems, or users. For example, the records of source database 108 may be updated, deleted, or added. In some embodiments, new data tables may be added or existing data tables may be removed. However, because these changes cannot be applied directly to the data of target database 110 while the initial load of data is ongoing, these changes may be tracked elsewhere and later copied to or implemented on target database 110.

Conventionally, during an initial load, during which data is copied from a source system to a target system, changes that occur on the original data are stored elsewhere by the source system. For example, if record 1 is changed, the entire record is logged with updated value, if record 1 is changed again, the entire record is again logged with the second updated value. Then upon completing the initial load, these logged changes are copied to the target system, which may include multiple entries for the same record, and then applied to the target database. This sequential and duplicative processing of data causes conventional systems to consume even more time and consume even greater resources, causing additional processing delays, beyond the initial load.

DRS 102 reduces the time required to both perform the initial load and implement any changes that may have occurred on the original data of source database 108 while the initial load was in progress. In some embodiments, DRS 102 may both replicate a source database 108 to a target database 110 of a target system 106, update the target database 110 with the changes that occurred to the original data during the initial load (as stored in a change database 118), and produce a live database 112 that is ready for real-time replication faster and more efficiently than may be otherwise possible with conventional replication approaches.

In some embodiments, source database 108 may be a row-oriented database in which each data table 114A, 114B has its own set of columns and with data organized into various rows or records. In the example shown, data table 114A includes the columns ID, C1, and C2, while data table 114B includes the columns ID, C3, C4, C5, and C6. For the sake of simplicity and illustration, only a subset of data values v1, v2 are illustrated for R2, and data values v3-v6 are illustrated for R5. However, it is understood that each row may include its own unique set of data values.

In some embodiments, prior to beginning the initial load, DRS 102 may install, establish, or configure a set of triggers 116. Triggers 116 may be a set of commands that cause source system 104, or source database 108, related to update change database 118 when the data of source database 108 is changed during the initial load process. In some embodiments, triggers 116 may cause source system 104 or source database 108 to write the original, new, changed, and/or delta values to a change database 118.

Example triggers 116 include Insert, Update, and Delete commands. In other embodiments, other change data commands may also or alternatively be used as triggers. Once triggers 116 have been configured, whenever the data of any of the data tables 114A, 114B of source database 108 is updated, inserted, or deleted, the changes are written to change database 118. Other, non-modifying commands, such as read commands executed by source database 108 may not be a trigger 116 nor cause any write command to change database 118.

In some embodiments, change database 118 may include a set of change tables 120A, 120B, that correspond to the data tables 114A, 114B from which data changes were detected. For example, data modification or edits (updates, inserts, deletes) to records of data table 114A may be stored in change table 120A, while edits or modifications to records of data table 114B may be stored in change table 120B.

In some embodiments, triggers 116 may be configured to only write the minimal amount of data necessary to record the change to the change tables 120A, 120B of change database 118 (rather than copying or storing the entire record associated with the change). For example, if only the value of column C6 of record R5 is changed, then rather than wasting additional computing resources in copying and storing all of the values of C3, C4, and C5 to change table 120B, a trigger 116 may cause change table 120B to minimally store the new or delta (Delta 2) value corresponding to C6 and a corresponding record ID (e.g., R5), thus saving time and computing resources.

For example, a record of data table 114A may include the identifier R1, and values New York City for C1, and 123-456-7890 for C2. If the value of C1 was changed to Fairfax, then rather than including all the unchanged information from the R1 record to change table 120A, change table 120A may include the record identifier RI and any delta value (or changed value), which in this case would be "Fairfax" for column C1. The 123-456-2890 value of C2 would not be copied to or stored in change table 120A.

In some embodiments, the delta values (e.g., delta 1, delta 2) may represent the most recent or up-to-date values for a particular record. For example, if the value of C6 was changed twelve times during the initial load of data from source database 108 to target database 110, rather than logging or including twelve different entries or twelve different C6 values (which would then have to be copied to target system and re-executed, which would consume and waste additional computing resources), delta 2 may represent the most up-to-date value that incorporates all of the twelve changes. Then for example, only the final delta 2 values would be copied to target system 106.

For example, if the value of C1 was later updated from "Fairfax" to "Seattle", rather than including two entries, one with R1 including "Fairfax" and a second with R1 including "Seattle", change table 120A may include a final entry in which R1 has the value "Seattle" for C1. In the example illustrated, Delta 1 and Time 1, and Delta 2, and Time 2, corresponding to new or updated values (deltas) for the indicated records R2, R5, at example Times 1 and 2.

Only maintaining one entry for each updated record in change tables 120A, 120B saves both resources in copying or writing and then storing extraneous or duplicative information in change tables 120A, 120B, and further saves resources when the records are transferred to target system 106. Thus, for example, rather than copying 12 different changed value records, each using up bandwidth, which then each need to be implemented or executed on target database 110, DRS 102 may transfer a single record with a final delta value which is then integrated with target database 110.

In the example illustrated, change tables 120A, 120B may include identical columns to the corresponding data tables 114A, 114B, however as noted above not all of the columns may include values. In some embodiments, change tables 120A, 120B may also include additional columns which may be used to track additional change information. For example, change table 120A may include a timestamp (TS) column and/or a Delete (Del) column.

In some embodiments, timestamp (TS) may indicate a date/time when the most recent edit was made, and/or a user ID of the user who made the edit. In some embodiments, change tables 120A, 120B may include a delete (Del) column to indicate when or if a particular row is deleted. For example, the delete flag being set indicates that record R1 was deleted at Time 3. If there was a later insert of the same record, the trigger 116 or DRS 102 may simply reset the delete flag in change database 118.

In some embodiments, after triggers 116 are set up to log delta values and partial records in change database 118, the initial load of data from source database 108 to target system 106 may begin or be initiated by DRS 102. In some embodiments, a data copier 122 may assist in copying or transforming the original data or information from the data tables 114A, 114B of source database 108 to corresponding target tables (not shown) to target system 106 or target database 110.

As indicated above, this initial load may require an extended period of time (multiple days) during which data from source database 108 is being edited and corresponding delta values are being stored in change database 118, particular if the source database 108 includes lots of values.

In some embodiments, a delta assembler 124 may, in parallel or simultaneously with the initial load, move records from change database 118 to a shadow database 128 at target system 106. Rather than waiting until initial load has completed, delta assembler 124 may periodically or continuously move updates from change database 118 to shadow database 128 at target system 106, using extra unused bandwidth and computing resources during the initial load, and this may save time and resources when integrating the changes from shadow database 128 with target database 110 after the initial load has completed.

For example, data assembler 124 may move one hundred updates or records from change database 118 at a time (or some other specified number of records, or 32 MB of data). Data assembler 124 may then assemble (as discussed in greater detail below) and move one hundred records to shadow database 128 while data copier 122 is copying records to target database 110, or intermittently at any point before source database 108 has been fully copied or loaded to target database 110. In some embodiments, data assembler 124 may periodically execute (e.g., move one hundred records every five minutes). Limiting the number of records and/or how often data assembler 124 executes may help prevent extra bandwidth consumption that may otherwise slow down the initial load. DRS 102 may repeat this process multiple times during the initial load until all the records of change database 118 are loaded to shadow database 128 and the initial load has completed.

As noted above, change database 118 may only include update or delta information indicating what data was changed in various records. In some embodiments, data assembler 124 may combine the original values from source database 108 with the delta values from change database 118 into a shadow record 126.

For example, in change table 120B, record or row R5, includes Delta 2 for column C6, and a timestamp Time 2. However, the values C3-C5 may not be stored in change table 120B to save storage space and resources. Data assembler 124 may then retrieve any missing values, not included in R5 in change table 120B, from data table 114, and assemble shadow record 126. As illustrated shadow record 126 may include both values from data table 114B and the corresponding change table 120B for record R5. In some embodiments, if R5 was deleted, the values C3-C6 may not be copied to shadow record 126, but instead, shadow record 126 may include the ID and Delete flag values.

DRS 102 may then store this complete or shadow record 126 in shadow database 128. In some embodiments, shadow database 128 may include or be configured (by DRS 102) with a similar schema or structure as change database 118, so that records can be copied with a simple copy command (as executed by data copier 122). In other embodiments, if target database 110 includes a different schema from source database 108, the shadow record 126 may be stored in accordance with the target database 110 schema, with transformations already performed. This assembling and copying of shadow records 126 to shadow database 128 may be occurring simultaneously with, or intermittently while the initial load of data from source database 108 to target database 110 is ongoing. Similar to change database 118, shadow database 128 may only include one entry for each record or row value, even if the record is updated multiple times. Shadow database 128 may store the most up-to-date values for each record.

DRS 102 may make efficient use of unused resources by storing, maintaining, or assembling shadow database 128 on target system 106 simultaneously with the ongoing initial load, which may further enable for a faster merging of changes from shadow database 110 with the copied data of target database 110 once the initial load has completed.

For example, once the initial load has completed, DRS 102 may provide or execute simple merge commands to combine the data from shadow database 128 into target database 110, resulting in a live database 112. Though illustrated as a separate block, live database 112 represents a target database 110 (for which the initial load and completed, and all the updates from shadow database 128 have been integrated), that is ready to receive or is receiving real-time or near real-time updates occurring on source system 104. As such, in practical application, target database 110 would be referred to as live database 112 once the shadow database 128 records have been integrated.

In some embodiments, the merge operation to combine shadow database 128 with target database 110 may be divided into two separate commands. A first command may merge the deleted records (e.g., those records for which a delete flag was set), and a second command may be an upsert command in which any updated or inserted records are updated to target database 110. The delete command may simply remove or delete the records from target database 110, for which the delete flag was set in shadow database 128. Upsert may cause the insertion of new records or update of existing records in target database 110. In other embodiments, the order in which records are merged may vary. In some embodiments, these merge commands may be structured query language (SQL) commands. In some embodiments, when the contents of a particular shadow record or table have been copied to target database 110, the contents of the shadow record 126 or shadow table may be deleted, thus freeing up the storage space.

Figure 2:
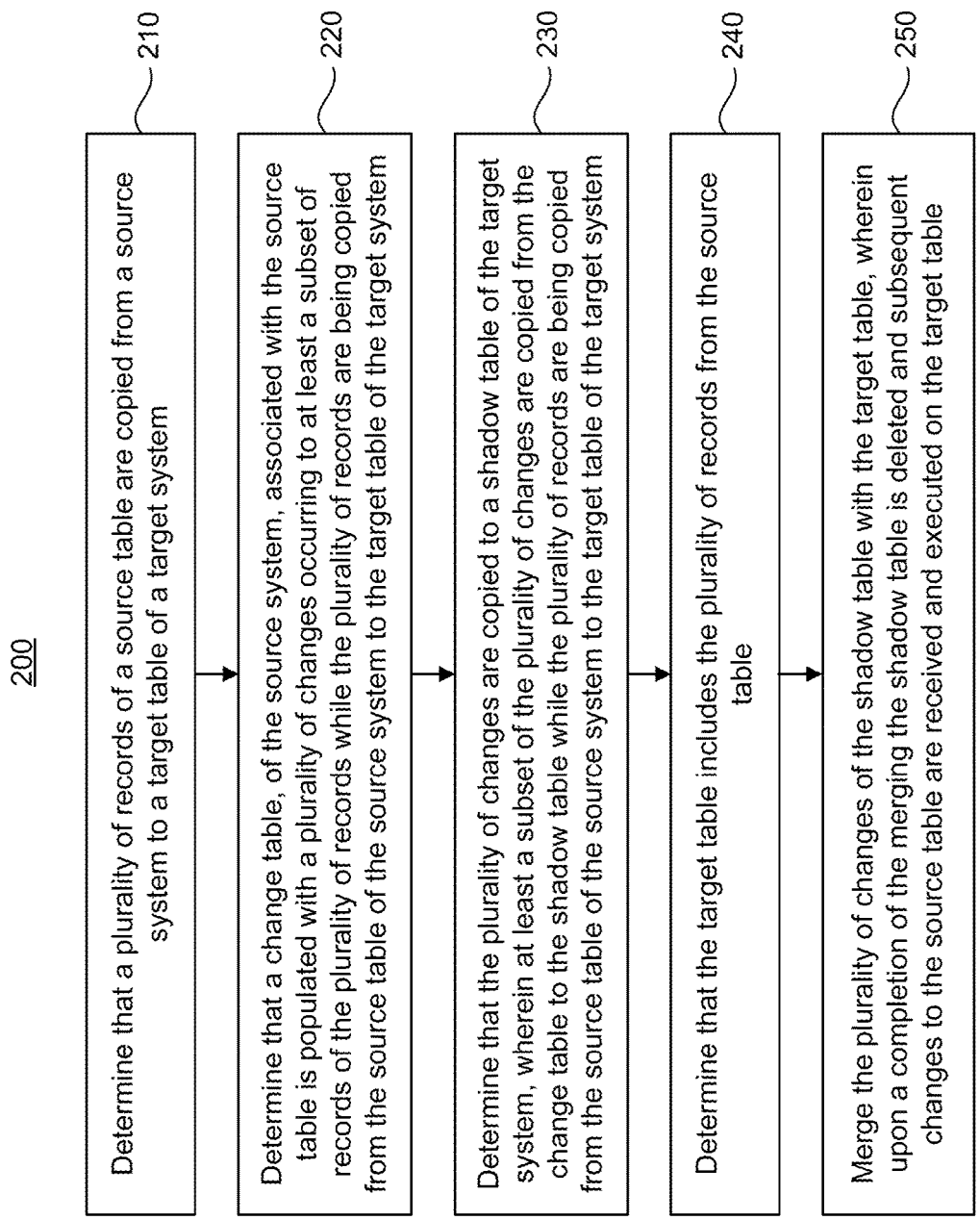
FIG. 2 is a flowchart illustrating example operations for functionality related to a data replication system, according to some embodiments.

FIG. 2 is a flowchart 200 illustrating example operations for functionality related to a data replication system, according to some embodiments. Method 200 can be performed by processing logic that can comprise hardware (e.g., circuitry, dedicated logic, programmable logic, microcode, etc.), software (e.g., instructions executing on a processing device), or a combination thereof It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to the figures.

In 210, it is determined that a plurality of records of a source table are copied from a source system to a target table of a target system. For example, data copier 122 may copy data from data tables 114A, 114B of source database 108 to tables of target database 110 during an initial load process.

In 220, it is determined that a change table, of the source system, associated with the source table is populated with a plurality of changes occurring to at least a subset of records of the plurality of records while the plurality of records are being copied from the source table of the source system to the target table of the target system. For example, prior to beginning the initial load process, DRS 102 may configure a set of triggers 116 that write changes to the original data of source database 108, to a change database 118. During the initial load process, as changes are made to the original data of data tables 114A, 114B, the delta values illustrating these changes may be written to the change database 118.

In 230, it is determined that the plurality of changes are copied to a shadow table of the target system, wherein at least a subset of the plurality of changes are copied from the change table to the shadow table while the plurality of records are being copied from the source table of the source system to the target table of the target system. For example, during the initial load process and after a subset of changes have been written to change database 118, delta assembler 124 may assemble shadow records 126 corresponding to each of a subset of the changes, and copy the shadow records 126 to a shadow table or shadow database 128 of target system.

In some embodiments, the shadow record 126 may be assembled directly on shadow database 128. For example values from change database 118 may be copied into a new record in shadow database 128 and then any missing values from corresponding records in source database 108 may be copied to the new shadow record 126 in shadow database 128. In some embodiments, the shadow records 126 of shadow database 128 may not be accessible to a user or administrator, or may be stored in a hidden or temporary table.

In 240, it is determined that the target table includes the plurality of records from the source table. For example, DRS 102 may detect or be notified that the initial has completed and that target database 110 includes all the records to be copied from source database 108.

In 250, the plurality of changes of the shadow table are merged with the target table. For example, after the completion of the initial load, DRS 102 may execute a subset of SQL commands that cause the changes of shadow database 128 to be merged with target database 110, resulting in a live database 112 that is configured for receiving and incorporating real-time or near real-time updates from source database 108.

Figure 3:
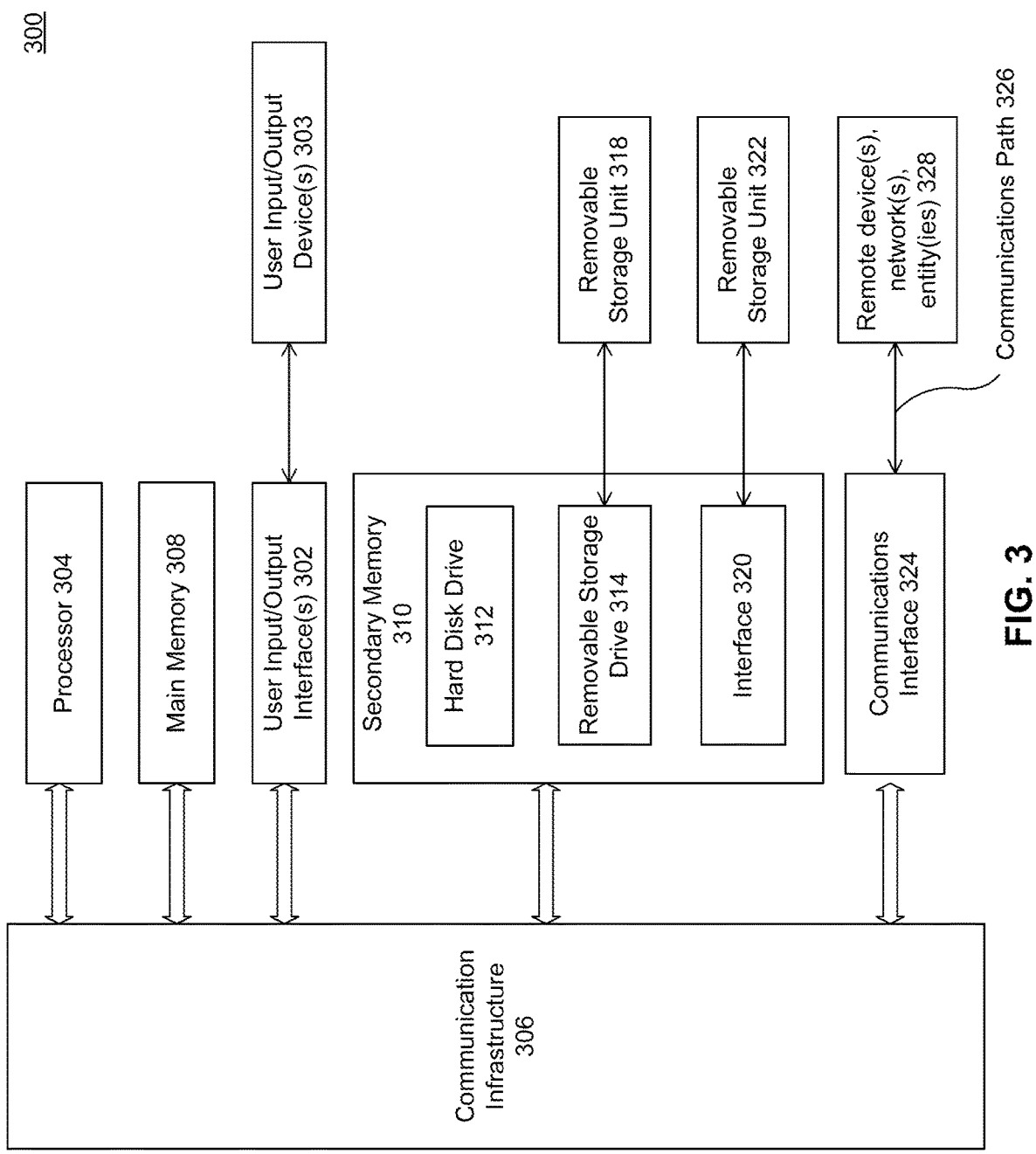
FIG. 3 is an example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random-access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" and/or cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A method comprising:
   determining that a plurality of records of a source table are copied from a source system to a target table of a target system;
   detecting one or more changes that have occurred to at least a subset of records of the plurality of records while the plurality of records are being copied from the source table of the source system to the target table of the target system;
   populating a change table of the source system, with the one or more changes that were detected to have occurred to the subset of records of the plurality of records while the plurality of records are being copied from the source table of the source system to the target table of the target system;
   determining that the plurality of changes are copied to a shadow table of the target system, wherein at least a subset of the plurality of changes are copied from the change table to the shadow table while the plurality of records are being copied from the source table of the source system to the target table of the target system;
   determining that the target table includes the plurality of records from the source table; and
   merging the plurality of changes of the shadow table with the target table, wherein upon a completion of the merging the shadow table is deleted and subsequent changes to the source table are received and executed on the target table.

2. The method of claim 1, wherein the change table includes a change record comprising a record identifier corresponding to a record in the source table, and change value information indicating which information of the corresponding record in the source table has changed.

3. The method of claim 2, further comprising:
   generating a shadow record including the change value information from the change record, and one or more values from the corresponding record in the source table corresponding to the record identifier.

4. The method of claim 3, wherein the shadow record includes data from the source table not included in the change record.

5. The method of claim 4, wherein the shadow table includes the shadow record, and wherein the shadow record is merged with the source table.

6. The method of claim 1, wherein the source table comprise a database including a plurality of tables, and wherein the source system comprises a plurality of change tables, wherein each change table corresponds to a different one of the plurality of tables of the database.

7. The method of claim 6, wherein the target system comprises a plurality of change tables, wherein each of the plurality of change tables corresponds to one of the plurality of change tables of the source system.

8. The method of claim 1, further comprising:
   configuring a plurality of triggers on the source table, wherein the plurality of triggers are configured to create a new entry in the change table based upon an update record, new record, or delete record change to the source table.

9. A system, comprising:
   a memory; and
   at least one processor coupled to the memory and configured to perform instructions that cause the at least one processor to perform operations comprising:
   determining that a plurality of records of a source table are copied from a source system to a target table of a target system;
   detecting one or more changes that have occurred to at least a subset of records of the plurality of records while the plurality of records are being copied from the source table of the source system to the target table of the target system;
   populating, a change table of the source system, with the one or more changes that were detected to have occurred to the subset of records of the plurality of records while the plurality of records are being copied from the source table of the source system to the target table of the target system;
   determining that, the plurality of changes are copied to a shadow table of the target system, wherein at least a subset of the plurality of changes are copied from the change table to the shadow table while the plurality of records are being copied from the source table of the source system to the target table of the target system;
   determining that the target table includes the plurality of records from the source table; and merging the plurality of changes of the shadow table with the target table, wherein upon a completion of the merging the shadow table is deleted and subsequent changes to the source table are received and executed on the target table.

10. The system of claim 9, wherein the change table includes a change record comprising a record identifier corresponding to a record in the source table, and change value information indicating which information of the corresponding record in the source table has changed.

11. The system of claim 10, the operations further comprising:
generating a shadow record including the change value information from the change record, and one or more values from the corresponding record in the source table corresponding to the record identifier.

12. The system of claim 11, wherein the shadow record includes data from the source table not included in the change record.

13. The system of claim 12, wherein the shadow table includes the shadow record, and wherein the shadow record is merged with the source table.

14. The system of claim 9, wherein the source table comprise a database including a plurality of tables, and wherein the source system comprises a plurality of change tables, wherein each change table corresponds to a different one of the plurality of tables of the database.

15. The system of claim 14, wherein the target system comprises a plurality of change tables, wherein each of the plurality of change tables corresponds to one of the plurality of change tables of the source system.

16. The system of claim 9, the operations further comprising:
configuring a plurality of triggers on the source table, wherein the plurality of triggers are configured to create a new entry in the change table based upon an update record, new record, or delete record change to the source table.

17. A non-transitory computer-readable medium having instructions stored thereon that, when executed by at least one computing device, cause the at least one computing device to perform operations comprising:
determining that a plurality of records of a source table are copied from a source system to a target table of a target system;
detecting one or more changes that have occurred to at least a subset of records of the plurality of records while the plurality of records are being copied from the source table of the source system to the target table of the target system;
populating a change table of the source system, with the one or more changes that were detected to have occurred to the subset of records of the plurality of records while the plurality of records are being copied from the source table of the source system to the target table of the target system;
determining that the plurality of changes are copied to a shadow table of the target system, wherein at least a subset of the plurality of changes are copied from the change table to the shadow table while the plurality of records are being copied from the source table of the source system to the target table of the target system;
determining that the target table includes the plurality of records from the source table; and
merging the plurality of changes of the shadow table with the target table, wherein upon a completion of the merging the shadow table is deleted and subsequent changes to the source table are received and executed on the target table.

18. The non-transitory computer-readable medium of claim 17, wherein the change table includes a change record comprising a record identifier corresponding to a record in the source table, and change value information indicating which information of the corresponding record in the source table has changed.

19. The non-transitory computer-readable medium of claim 18, the operations further comprising:
generating a shadow record including the change value information from the change record, and one or more values from the corresponding record in the source table corresponding to the record identifier.

20. The method of claim 1,
wherein the detecting comprises:
determining that a first record comprises a first value and a second value; and
detecting that the first value has changed to a new value; and wherein the populating comprises:
populating the change table with the new value of the first record, and wherein the second value is not populated in the change table.

* * * * *